(12) United States Patent
Hollander

(10) Patent No.: US 6,450,751 B1
(45) Date of Patent: Sep. 17, 2002

(54) FACILITY FOR ORDER-PROCESSING OF PRODUCTS, PARTICULARLY ORDER-PROCESSING OF FOODSTUFFS IN RECTANGULAR PACKAGING

(75) Inventor: R. R. Hollander, Vorden (NL)

(73) Assignee: Dynamic Systems Engineering bv (NL)

( * ) Notice: Subject to any disclaimer, the term of this patent is extended or adjusted under 35 U.S.C. 154(b) by 0 days.

(21) Appl. No.: 09/503,957

(22) Filed: Feb. 14, 2000

(30) Foreign Application Priority Data

Feb. 12, 1999 (DE) .......................... 199 05 967

(51) Int. Cl.$^7$ ................................ B65G 1/04
(52) U.S. Cl. .................. 414/268; 414/276; 414/286; 198/347.4
(58) Field of Search .................. 414/268, 269, 414/276, 278, 285, 286, 807, 277; 198/347.4

(56) References Cited

U.S. PATENT DOCUMENTS

| | | | | |
|---|---|---|---|---|
| 2,096,958 A | * | 10/1937 | Clerc | 414/276 |
| 3,027,023 A | * | 3/1962 | McGrath | 414/276 |
| 3,173,557 A | * | 3/1965 | Eliassen | 198/347.4 |
| 3,370,720 A | * | 2/1968 | Schickle | 414/277 |
| 3,616,944 A | * | 11/1971 | Field | 414/285 |
| 4,212,381 A | | 7/1980 | Cook | 193/40 |
| 4,527,937 A | * | 7/1985 | Tomasello, Jr. | 414/276 |
| 4,668,151 A | * | 5/1987 | Oberoi et al. | 414/277 |
| 5,582,497 A | * | 12/1996 | Noguchi | 414/268 |
| 5,664,928 A | * | 9/1997 | Stauber | 414/269 |
| 5,672,039 A | * | 9/1997 | Perry et al. | 414/286 |
| 6,186,724 B1 | * | 2/2001 | Hollander | 414/276 |

FOREIGN PATENT DOCUMENTS

| | | | |
|---|---|---|---|
| DE | 2416420 A1 | 10/1975 | |
| DE | 3823540 C1 | 2/1990 | |
| DE | 4021665 A1 | 1/1992 | |
| JP | 1-275309 | * 11/1989 | 414/286 |
| JP | 2-182601 | * 7/1990 | 414/276 |
| JP | 3-102004 | * 4/1991 | 414/268 |
| JP | 6-001404 | * 1/1994 | 414/277 |
| WO | WO 98/06646 | 2/1998 | |

OTHER PUBLICATIONS

"Optimale Kommissionierstrategie", Kommissionier technik, Nov. 1992.

* cited by examiner

Primary Examiner—James W. Keenan
(74) Attorney, Agent, or Firm—R W Becker & Associates; R W Becker

(57) ABSTRACT

A facility for order-processing of products, particularly for order-processing of foodstuffs in rectangular packaging, is provided. The facility includes a goods entrance for transport pallets loaded with identical goods and a goods exit for transport containers with the goods that have been assembled into orders. The facility furthermore has a storage area downstream of the goods entrance with racks for storing the pallets and an order-processing area where individual goods are removed and combined for the transport containers. In order to create a facility for order-processing of products in which high turn-around rates can be achieved with low requirements for space, the path of the flow of goods between goods entrance and goods exit follows an inbound segment and an outbound segment parallel thereto in a "U" shape. The free ends of the inbound and outbound segments make up the goods entrance and exit. The storage area is situated on the inbound segment; the order-processing area is situated solely on the outbound segment.

9 Claims, 3 Drawing Sheets

FACILITY FOR ORDER-PROCESSING OF PRODUCTS, PARTICULARLY ORDER-PROCESSING OF FOODSTUFFS IN RECTANGULAR PACKAGING

BACKGROUND OF THE INVENTION

The invention concerns a facility for order-processing of products, particularly for order-processing of foodstuffs in rectangular packaging, comprising:

a goods entrance for transport pallets loaded with identical goods by the food product manufacturer;

a goods exit for transport containers that are ready to ship comprising various goods assembled for the order;

a storage area downstream of the goods entrance comprising racks for storing the loaded transport pallets; and, an order-processing area comprising means for removing individual goods and/or containers and for combining them for the transport containers.

Warehouse order-processing technology is gaining importance in all fields of commerce and in particular in the wholesale foods industry. However, warehousing in its narrower sense (i.e., static storage of individual goods) is becoming less significant while the dynamic processes and especially turn-around handling of goods is gaining importance. The goal of modern warehousing is therefore to keep the retention time of the individual goods in the warehouse to a minimum and thus to keep to a minimum the amount of capital tied up in warehousing.

The semi-automated facilities used for order-processing in the foods industry are generally multi-story racks that constitute storage passages for the goods and that are arranged adjacent to and above each other. The floors of the passages thus formed are provided with roller conveyors made of freely rotatable rollers and are slightly inclined so that gravity causes the goods warehoused at the one end of the passage, the so-called stocking or loading side, to move along the roller conveyors to the other end of the passage, the removal or order-processing side. Placing the containers of goods into position on the stocking side is done manually in that the individual goods are removed from a pallet holding identical goods and placed into the assigned passage. In the foodstuffs industry, order-processing with such racks at the removal side is also performed manually.

In many cases, however, no roller conveyors at all are used for the transport pallets; the pallets are first put into temporary storage in multi-story racks, and the lower-most surface, which is the most easily accessed by workers, is used for the transport pallet for the order currently being processed. If this pallet is empty, a forklift that can drive in the passages between the racks replaces it with one of the full, in-stock pallets above the empty pallet. Also moving about in the same passage between the racks in which the forklifts move are the workers who assemble the orders, which leads to mutual obstruction and thus to less efficient order-processing.

Finally, also known are racks comprising a stocking side and an order-processing side in which computer-controlled removal devices in the form of conveyors can be driven in a passage arranged on the order-processing side of the racks. Corresponding to the order, the conveyors take the product containers maintained in-stock in the passages running transversely and assemble the order. The conveyors used for this can be driven over corresponding guides in two coordinates so that each conveyor can access individually each of the passages arranged adjacent to and above each other. The distances covered by the conveyors are very long, however, which is why such an order-processing facility is not suitable for rapidly filling a plurality of different containers and thus is not suitable for achieving high rates of turn-around. However, turn-around rates in the foodstuffs industry are particularly high, and this with a generally high number of different containers per order.

The object of the invention is to create a facility for order-processing of products with which facility high rates of turn-around can be achieved with low space requirements when the orders processed regularly comprise a plurality of different goods and/or containers.

SUMMARY OF THE INVENTION

Suggested as a solution in a facility for order-processing of the type cited in the foregoing is that the path of the flow of goods between goods entrance and goods exit follows an inbound segment ($W_1$) and an outbound segment ($W_2$) parallel thereto in a "U" shape, the free ends of the inbound and outbound segments comprising the goods entrance and exit, and the storage area being situated on the inbound segment and the order-processing area being situated solely on the outbound segment.

An essential element of the invention is that the flow of goods from the goods entrance to the exit essentially follows a "U"-shaped path comprising parallel inbound and outbound segments. The essential advantage of such a basic layout for the facility is that the mutual consequences and obstacles caused by the flow of goods due to intersecting flows can be avoided, this achieving very high efficiency in terms of product turn-around and associated with low space requirements. Furthermore, for achieving uniform utilization of the surfaces available, it is important that the storage area is divided on the one hand and that the order-processing area separated therefrom is divided on the other hand. The invention suggests that the storage area be situated on the inbound segment of the U-shaped flow of goods and that the order-processing area be situated solely on the outbound segment. This means that if transport pallets coming from the manufacturer are stored temporarily on the inbound segment, subsequent order-processing occurs in a flow that is essentially directionally opposed thereto, i.e., on its outbound segment, given a path of flow that is essentially U-shaped. This type of flow requires a "turning point" at which the inbound segment transitions to the outbound segment. For the invention it is important that this turning point is reached prior to the goods reaching order-processing storage, where they are automatically assembled for the required orders.

The transport pallets that are each loaded with identical goods by the manufacturer are situated solely in the storage area, while the goods and/or containers in the order-processing area have already been separated so that they can be processed—fully automatically—to assemble orders, also in the order-processing area. This facilitates high turn-around rates even when the orders processed comprise a plurality of different products and product containers, as is frequently the case in the foodstuffs industry.

The products and containers on the transport pallets must be separated between the storage area, in which the transport pallets are still loaded with uniform goods, and the order-processing area. One layout suggests a depalletizing station for unloading the transport pallets removed from the storage area, this depalletizing station being arranged in the flow of goods between the storage area and the order-processing area.

In order to obtain optimal utilization of available space, the depalletizing station can be arranged jointly with the order-processing area on the outbound segment of the U-shaped path of the flow of goods. In this case the storage area is situated on the inbound segment, while depalletizing station and order-processing area together define the outbound segment of the flow of goods that in its entirety comprises a U-shape.

Suggested for transporting the goods containers from the depalletizing station to the order-processing area is a conveyor embodied as a roller conveyor over at least a portion of its length, one section of which extends along the order-processing area.

In a preferred embodiment it is furthermore suggested that the order-processing area comprises:

an order-processing storage area that comprises a plurality of parallel passages for processing the ordered goods, each passage containing only identical goods;

a loading area at one end of the passages comprising means for stocking new goods in the assigned passages; and, removal apparatuses at the other end of the passages for computer-controlled transport of individual goods out of the passages to downstream conveyors, wherein each passage is provided a discrete removal apparatus that is actuatable independent of the other removal apparatuses. An order-processing area designed in this manner can achieve very high rates of turn-around because each individual passage is provided a discrete removal apparatus that is actuatable computer-controlled independent of the other removal apparatuses. A very high rate of turn-around is achieved that at full capacity would make it possible to remove goods from all of the passages simultaneously and process them to fill an order.

The invention furthermore suggests that the means for stocking new goods in the passages cooperates with the section of conveyor that leads from the depalletizing station to the order-processing area.

The means for stocking new goods in a passage is preferably a cross-conveyor that travels toward the passage.

The containers removed from the passages when an order is being processed are preferably transported via a continuously driven conveyor that extends along the removal apparatuses and perpendicular to the passages.

In a preferred embodiment it is furthermore suggested that the passages are roller conveyors that incline away toward the removal apparatuses and that extend perpendicular to the outbound segment of the flow of goods.

Finally, the invention suggests that the conveyor for the removed goods leads to at least one long packing table that extends perpendicular to the outbound segment of the flow of goods.

BRIEF DESCRIPTION OF THE DRAWINGS

Details of a facility for order-processing in accordance with the invention can be found in the following description of exemplary embodiments, with reference to the accompanying drawings, in which.

DESCRIPTION OF PREFERRED EMBODIMENTS

Figure 1:
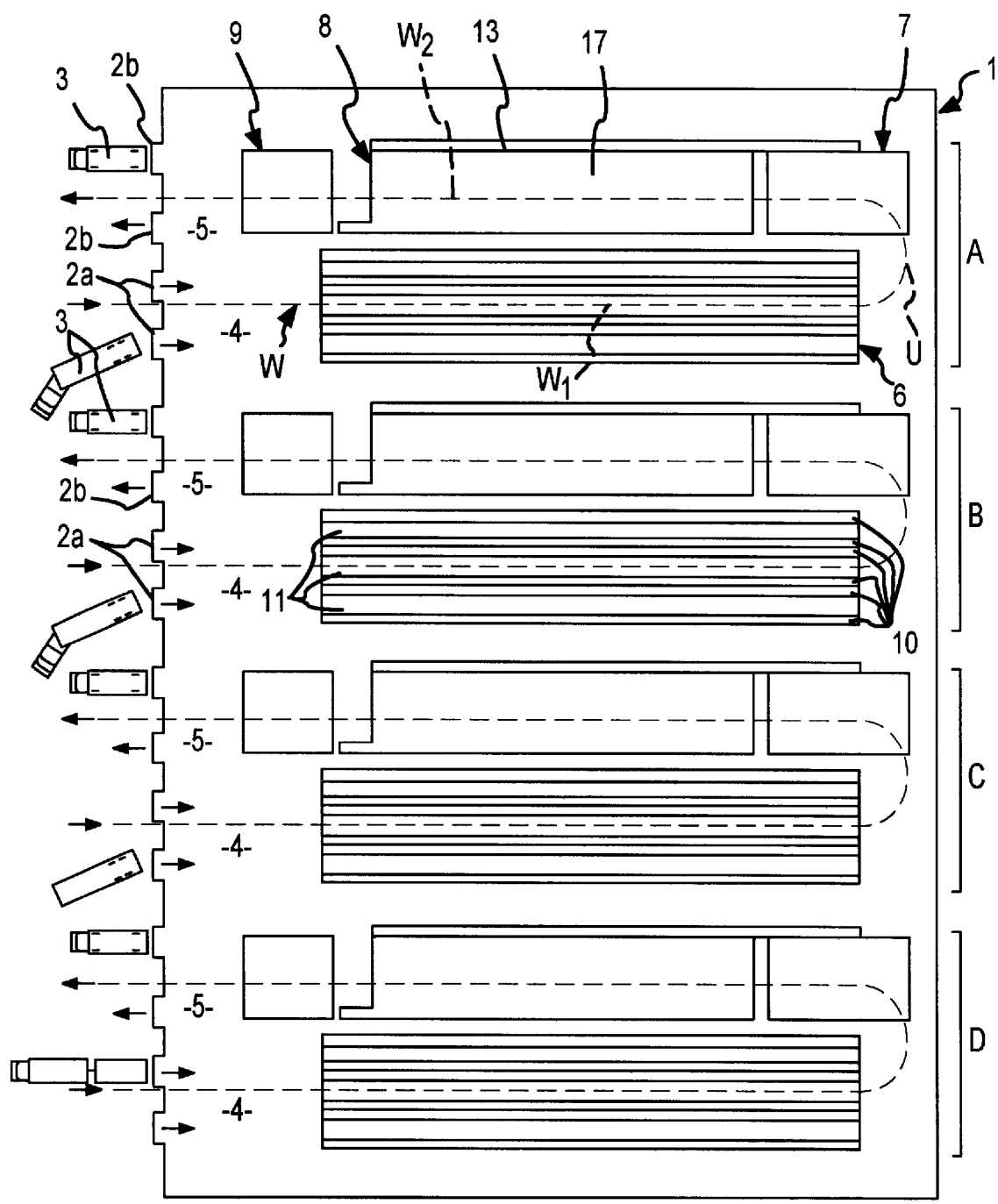
FIG. 1 is a highly simplified general diagram that is a top-view of an order-processing facility housed in a building, especially an order-processing facility for foodstuffs.

FIG. 1 illustrates the order-processing facility in its entirety. It is located in a large rectangular hall 1, along the one longitudinal side of which are arranged doors and arrival and departure platforms 2a, 2b for trucks 3. As can particularly be seen in FIG. 1, the facility comprises a total of four identical modules A, B, C, D. The modules are arranged adjacent to each other, delivery platforms 2a for the delivery of new goods and departure platforms 2b for the transport of goods assembled for orders belonging to each module A, B, C, D.

In FIG. 1, the flow of goods is indicated by dashes and is labeled W; each module has such a flow. What should be appreciated is that the flow of goods W essentially follows a "U" shape, comprising an inbound segment $W_1$ that extends from the goods entrance 4 behind the delivery platform 2a and furthermore comprising an outbound segment $W_2$ that ends at the goods exit 5 in front of the transport platform 2b. The turning point U in the flow of goods is located at the side of the hall 1 opposite the goods entrance 4 and exit 5.

Of course characterizing the flow of goods W as U-shaped does not mean that all of the transport pallets and containers precisely follow the path shown; on the contrary, the intent is to indicate a generalized description of the path followed by the goods first delivered by the manufacturers until they depart the facility after orders have been processed and they have been assembled in appropriate transport containers for delivery to grocery stores. It is entirely permissible for the goods to travel some segments that run diagonal or perpendicular to the flow of goods W, as will be shown in more detail in the following. Nor does transport transpire solely in one horizontal plane; rather, to an extent it also occurs in a plurality of horizontal planes. However, the flow of goods along the inbound segment $W_1$ does not cross the flow of goods along the outbound segment $W_2$.

The individual stations in the flow of goods W are described in the following with reference to FIG. 1. The recently arrived transport pallets initially travel from the goods entrance 4 to a storage area 6, which is likewise situated on the inbound segment $W_1$. The pallets removed from the storage area 6 then travel to an unloading station 7 situated in the exemplary embodiment on the outbound segment $W_2$ of the flow of goods W. Here the pallets are unloaded, the individual goods and/or containers then travel to an order-processing area 8 that is situated solely on the outbound segment $W_2$. Finally, the separated goods that have been assembled into orders travel out of the order-processing area 8 to a shipping area 9 that communicates with the goods exit 5 and the departure platform 2b. Depalletizing station 7, order-processing area 8, and shipping area 9 are on the outbound segment $W_2$ of the flow of goods W and thus extend essentially parallel to the storage area 6 but opposite the storage area 6 with respect to the forward flow.

Figure 2:
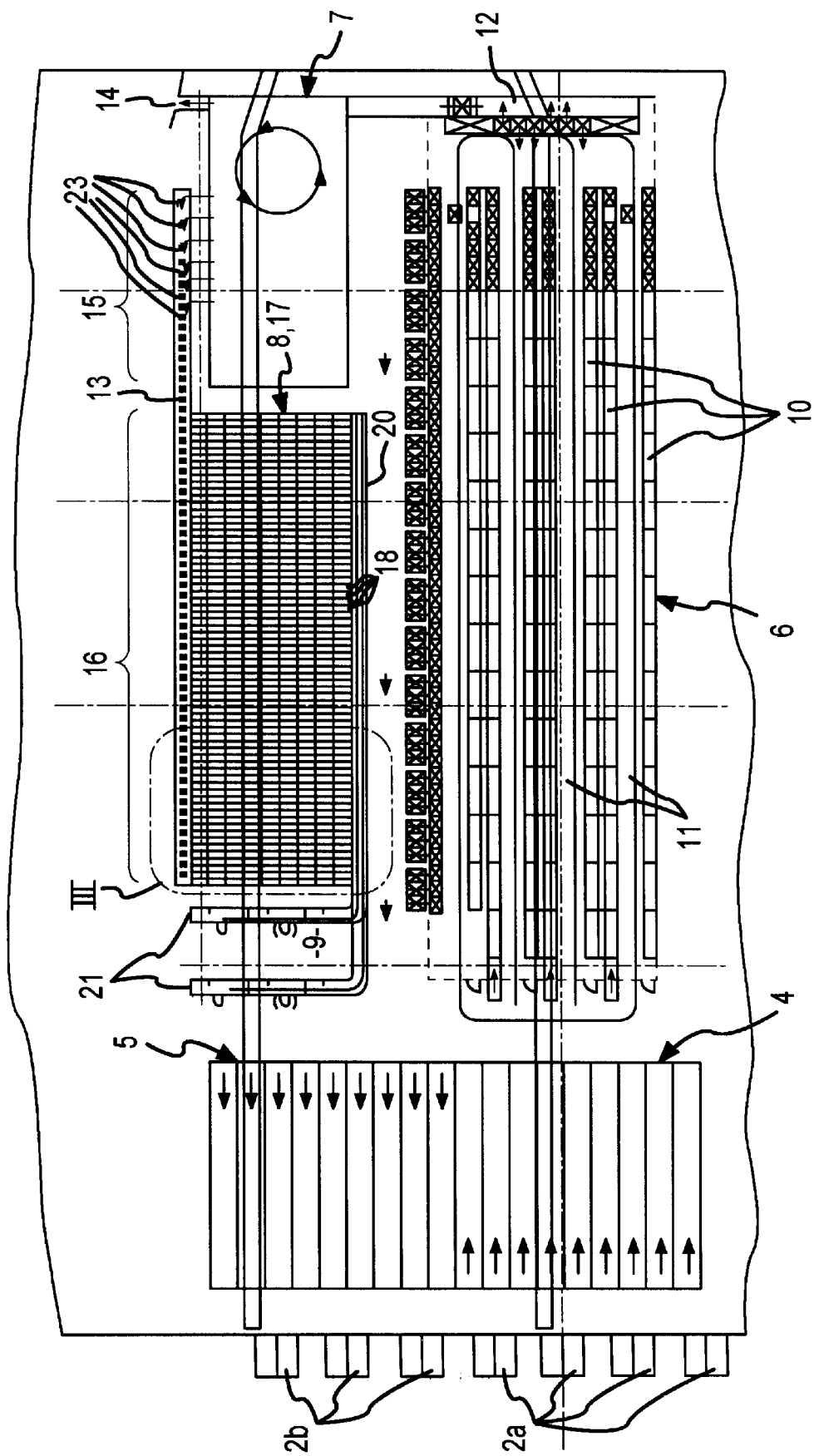
FIG. 2 is a further top-view of one of the modules in the facility, enlarged and in greater detail than in FIG. 1.

Details of each of the modules are discussed in the following with reference to FIG. 2. The incoming transport pallets that have all been loaded with identical goods by the manufacturer are controlled at the goods entrance 4. The pallets are the industrial pallets conventionally used in industry and commerce. Each pallet can be provided with suitable identification so that transporting it automatically within the storage area 6 is then possible. Inside the storage area 6, the pallets are placed on racks 10 situated on both sides of conveying passages 11. The racks 10 are multi-story and are stocked and unloaded by means of fully-automatic equipment that moves in the aisles 11. Each aisle 11 is just narrow enough that such a piece of equipment can move computer-controlled back and forth. All of the aisles 11 extend parallel to each other and are precisely parallel to the inbound segment $W_1$ in accordance with FIG. 1.

The computer-supported warehousing of the loaded pallets on the racks 10 of the storage area 6 is chaotic, i.e., the pallets are not placed according to group; rather, they are placed solely according to the criteria of turn-around speed, available space, and access time to the individual compartments in the racks 10.

The automatic equipment places pallets it has removed from the racks 10 onto a cross-conveyor 12. The cross-conveyor 12 transports the still-loaded pallets to the depalletizing station 7. This movement within the flow of goods corresponds to the turning point U in FIG. 1.

At the depalletizing station 7 the shrink or stretch wrap is first removed from the pallets. Then each pallet is unloaded individually, the separated goods and/or containers being placed on a conveyor 13. Depalletization and transfer to the conveyor 13 are preferably performed by means of a depalletizing robot, known per se. It recognizes the position of the individual packages on the pallet, selects them, and then places them on the conveyor 13. Once the pallet has been emptied, it travels via an exit 14 out of the depalletizing station 7. If it is not necessary or possible to completely unload a pallet, it can travel back with a partial load to the storage area 6 via the cross-conveyor 12 in order then to be completely unloaded at some later time.

The separated goods and/or containers travel via the conveyor 13 to the order-processing area 8. The conveyor 13 travels in the direction of the outbound segment $W_2$ in accordance with FIG. 1, a first segment 15 of the conveyor 13 extending along the depalletizing station 7 and a second segment 16 of the conveyor 13 extending along the order-processing area 8. At least the second segment 16 is a roller conveyor with driven rollers.

Most of the order-processing area 8 constitutes a storage area 17 that comprises a plurality of storage passages 18 extending parallel to each other for the goods processed in orders. Only identical goods are located in each passage 18. Starting from the conveyor 13, the passages 18 are inclined and provided with roller conveyors so that the force of gravity causes the goods traveling from the conveyor 13 in the passages 18 to roll along the passages 18 to the opposite end. Braking devices in the passages 18 prevent the goods and/or containers from reaching excessive speeds in the passages 18.

A cross-conveyor 16a transfers goods from the conveyor 13 into the passage 18. Preferably situated in front of each passage 18 is a discrete cross-conveyor 16a that conveys the goods meant for the passage into the entrance of the passage 18.

The goods are removed individually at the other, lower end of the passage 18 in accordance with the order. Each passage 18 is provided a discrete removal apparatus 19 that is controllable independent of the removal apparatuses for the other passages 18. The item provided by controlling the corresponding removal apparatus 19 travels on a conveyor 20 that travels perpendicular to the passages 18 and that leads to the packing tables 21.

Figure 3:
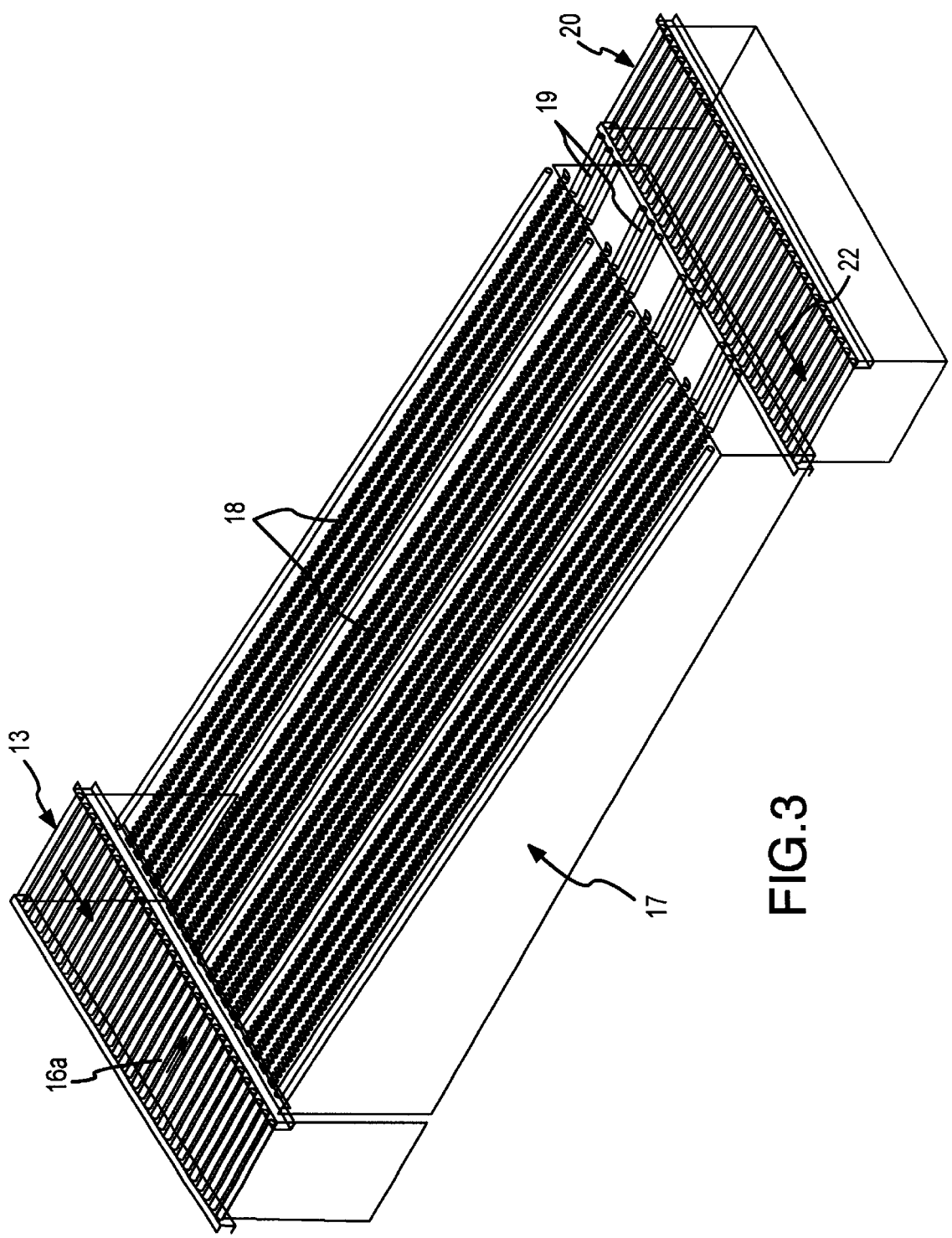
FIG. 3 is a perspective view of a section of the order-processing area in the facility, this section labeled III in FIG. 2.

FIG. 3 illustrates the storage area 17 in detail, including the cross-conveyor 16a, the inclined passages 18, the removal apparatuses 19, and the common conveyor 20. It is to be appreciated that the conveyor 20 and the conveyor 13 comprise driven rollers. The direction of transport 22 of the conveyor 20 extending longitudinally is the same as the direction of transport of the conveyor 13 arranged above, but offset and parallel. In addition, the conveyor 20 is situated closer to the storage area 6 than the conveyor 13. The passages 18 accordingly extend perpendicular to the conveyor 13 and conveyor 20 and are thus also perpendicular to the outbound segment $W_2$ in accordance with FIG. 1.

In the exemplary embodiment, the conveyor 20 leads in a plurality of terminal lines to the packing tables 21, wherein the packing tables 21 are oriented parallel to the passages 18 of the storage area 17. The containers for each order that arrive at the packing tables 21 are removed there by workers and packed in transport containers. These then travel to the goods exit 5, where an outbound goods control can be performed.

Only identical goods are located in each of the passages 18 of the storage area 17. Therefore if a pallet is unloaded in the depalletizing station 7, the containers separated in this manner travel successively via the conveyor 13 to the front of the specified passage 18 and then into the passage via the cross-conveyor 16a activated there. Successive containers for other types of goods are correspondingly conveyed into a different passage 18.

Order-processing for containers maintained in-stock in the storage areas 18 is accomplished by means of computer-controlled actuation of the removal apparatuses 19 allocated to the individual passages. This makes possible a very high speed of order-processing. If the facility were operating at full capacity it would even be possible to remove containers from all of the passages simultaneously and assemble an order.

For reasons of overview the individual parts of the storage area 17 in FIG. 3 are only illustrated on one plane. However, it is in fact advantageous to design the storage area with multiple stories. However, since the depalletizing station 7 is situated on only one plane, the sites 23 at which the conveyors 13 transporting to different levels begin are arranged adjacent to each other.

The specification incorporates by reference the disclosure of German Priority document 199 05 967.5 of Feb. 12, 1999.

The present invention is, of course, in no way restricted to the specific disclosure of the specification and drawings, but also encompasses any modifications within the scope of the appended claims.

What is claimed is:

1. A facility for order-processing of products, comprising:
   a goods entrance for receiving transport pallets loaded with identical goods;
   a storage area disposed downstream of said goods entrance and comprising racks for storing said loaded transport pallets;
   an order-processing area comprising an order-processing storage area having a plurality of parallel passages for processing ordered goods, each passage containing only identical goods; a loading area at one end of said passages having means for stocking new goods into assigned ones of said passages; and removal apparatuses at the other end of said passages for computer-controlled transport of individual goods out of said passages to downstream first conveyors, wherein each of said passages is provided with a discrete removal apparatus that is actuatable independent of the other removal apparatuses;
   a goods exit for transport containers that are ready to ship and that contain various goods assembled for an order, wherein a path of the flow of goods between said goods entrance and said goods exit follows an inbound segment and an outbound segment disposed parallel thereto and in the shape of a U, free ends of said inbound and outbound segments respectively comprising said goods entrance and exit, and wherein said storage area is situated on said inbound segment and said order-processing area is situated solely on said outbound segment; and a depalletizing station for unloading the transport pallets removed from said storage area, said depalletizing station arranged in said flow of goods between said storage area and said order-processing area.

2. A facility in accordance with claim 1, wherein said depalletizing station is arranged jointly with said order-processing area on said outbound segment of said U-shaped path of said flow of goods.

3. A facility in accordance with claim 2, wherein at least one second conveyor is provided that travels from said depalletizing station to said order-processing area, and wherein a section of said at least one second conveyor extends along said order-processing area.

4. A facility in accordance with claim 3, wherein said first conveyors comprise a continuously driven first conveyor that extends along said removal apparatuses for goods removed from said passages.

5. A facility in accordance with claim 4, wherein said first conveyor is situated closer to said storage area than is said second conveyor that extends along said order-processing area.

6. A facility in accordance with claim 1, wherein said means for stocking new goods into said passages cooperates with at least one second conveyor that travels from said depalletizing station to said order-processing area.

7. A facility in accordance with claim 1, wherein said means for stocking new goods into a passage is a cross-conveyor that travels toward said passage.

8. A facility in accordance with claim 7, wherein each of said passages is allocated a discrete cross-conveyor.

9. A facility in accordance with claim 1, wherein said first conveyors for removed goods lead to at least one long packing table that extends perpendicular to said outbound segment of said flow of goods.

* * * * *